(12) United States Patent
Caron et al.

(10) Patent No.: US 6,394,021 B1
(45) Date of Patent: May 28, 2002

(54) FLOATING BICYCLE GEAR INDICATOR

(75) Inventors: Andrew J. Caron, Brookfield; Kent Solberg, Chicago; Stacey Chang, Chicago; Jacob Brauer, Chicago; John Lake, Evanston, all of IL (US)

(73) Assignee: SRAM Corporation, Chicago, IL (US)

( * ) Notice: Subject to any disclaimer, the term of this patent is extended or adjusted under 35 U.S.C. 154(b) by 28 days.

(21) Appl. No.: 09/681,055

(22) Filed: Dec. 13, 2000

(51) Int. Cl.[7] ............................................... B62K 21/12
(52) U.S. Cl. ........................ 116/28.1; 116/301; 74/551.8
(58) Field of Search ............................... 116/28.1, 317, 116/318, 319, 320, 316, 293, 300, 301; 74/489, 502.2, 551.8; 474/80, 82, 178; D12/114

(56) References Cited

U.S. PATENT DOCUMENTS

| 3,901,095 A | | 8/1975 | Wechsler | 474/81 |
| 3,965,763 A | * | 6/1976 | Wechsler | 474/81 |
| 4,412,828 A | * | 11/1983 | Darby | 474/81 |
| 5,178,033 A | | 1/1993 | Kund | 74/501.5 R |
| 5,259,333 A | * | 11/1993 | Iino et al. | 116/286 |
| 5,621,382 A | * | 4/1997 | Yamamoto | 340/432 |
| 6,199,446 B1 | * | 3/2001 | Ose | 74/502.2 |
| 6,265,967 B1 | * | 7/2001 | Okada | 340/432 |
| 6,295,888 B1 | * | 10/2001 | Watarai | 74/502.2 |

FOREIGN PATENT DOCUMENTS

| DE | 9113406 | 2/1992 | ......... B62M/25/02 |
| EP | 0647556 | 4/1995 | ......... B62M/25/04 |
| EP | 1002713 | 5/2000 | ......... B62M/25/02 |
| EP | 1024078 | 8/2000 | ......... B62M/25/02 |

* cited by examiner

Primary Examiner—Diego Gutierrez
Assistant Examiner—R. Alexander Smith
(74) Attorney, Agent, or Firm—Milan Milosevic; Lisa Wunderlich

(57) ABSTRACT

A gear indicator for a bicycle that includes first and second control cables connected to first and second shift actuators, respectively. The gear indicator includes a housing mounted onto the control cables. The housing is spaced apart from the shift actuators and is not attached to the handlebars. First and second pulleys are disposed in the housing and are rotatable by a displacement of the first and second control cables, respectively. First and second gear display elements are movable in response to the rotation of the first and second pulleys. The first and second display elements indicate the currently selected gears of the bicycle.

30 Claims, 4 Drawing Sheets

FLOATING BICYCLE GEAR INDICATOR

BACKGROUND OF INVENTION

This invention relates to gear indicators for bicycles and more particularly to a gear indicator that is centrally located about the handlebars without having to be attached to the handlebars or bicycle frame.

It is known in the art relating to bicycles to provide a gear indicator to inform a rider of the current gear position of the bicycle transmission. Usually, bicycle transmissions are controlled by a manually operated shift actuator that includes a control cable having an inner wire that slides within a tubular outer housing. One end of the inner wire is connected to the shift actuator, and the other end of the inner wire is connected to the bicycle transmission. The shift actuator selectively pulls or releases the inner wire to change gears in the transmission. The bicycle transmission may be a derailleur or internal hub transmission.

Typically, the shift actuator will have some sort of indicator associated with it to indicate the currently selected gear position of the bicycle transmission. Derailleur operated transmissions usually have a front derailleur shift actuator and a rear derailleur shift actuator, so one indicator is attached to the rear derailleur shift actuator to indicate the currently selected gear for the rear derailleur and another indicator is attached to the front derailleur shift actuator to indicate the currently selected gear for the front derailleur. Consequently, since the shift actuators are usually mounted at the opposite sides of the handlebar, the rider must inconveniently look to opposite ends of the handlebar to ascertain the currently selected gears.

Several attempts have been made to overcome the above stated inconvenience by remotely locating the gear indicators from the shift actuators. Typically, these types of gear indicators have been attached to the handlebars. A drawback with this configuration is that the gear indicators are not adaptable to various sizes and shapes of the handlebars. In addition, the indicator takes up needed place for other devices that need to be attached to the handlebars such as bicycle computers, lights, etc. Therefore, there is a need for a bicycle indicator that is centrally located near the handlebars, but not attached to the handlebars or frame.

SUMMARY OF INVENTION

The present invention provides a gear indicator for a bicycle that includes first and second control cables connected to first and second shift actuators, respectively. The gear indicator includes a housing mounted onto the first and second control cables. The housing is spaced apart from the first and second shift actuators and is not attached to the handlebars of the bicycle. A first pulley is disposed in the housing and is rotatable by a displacement of the first control cable. A second pulley is disposed in the housing and is rotatable by a displacement of the second control cable. A first gear display element is movable in response to the rotation of the first pulley. A second gear display element is movable in response to the rotation of the second pulley. The first and second display elements indicate the currently selected gears of the bicycle.

The housing lies in two different planes that may be substantially orthogonal to each other to provide a good viewing angle of the gear display elements. Also, the shape of the housing provides stability to the gear indicator by directing the control cables to enter the housing in one plane and exit the housing in another plane. Thus, the housing includes at least one cable inlet that lies in one plane and at least one cable outlet that lies in another plane. The housing may further include a display window for viewing the first and second display elements. The display window lies in the same plane as the cable inlet to provide a good viewing angle. The first and second pulleys may be substantially coaxial. The first and second gear display elements may also rotate about the same axis as the pulleys to provide a compact construction. To provide easy viewing of the gear indicator, the housing is disposed on the control cables in close proximity to a center of the handlebars.

The present invention provides a gear indicator that is centrally located near the handlebars, preventing the rider from having to look at the ends of the handlebars to ascertain the current gears of the bicycle. The gear indicator integrates two indicators for front and rear transmissions into a easily viewable single display. It also provides a gear indicator that does not have to be attached to the handlebars, resulting in more space available for other devices to be attached to the handlebars and a simpler design with one less part. Further, this configuration provides a more flexible construction such that the gear indicator bends when a force is applied against it.

These and other features and advantages of the invention will be more fully understood from the following description of certain specific embodiments of the invention taken together with the accompanying drawings.

DETAILED DESCRIPTION

Figure 1:
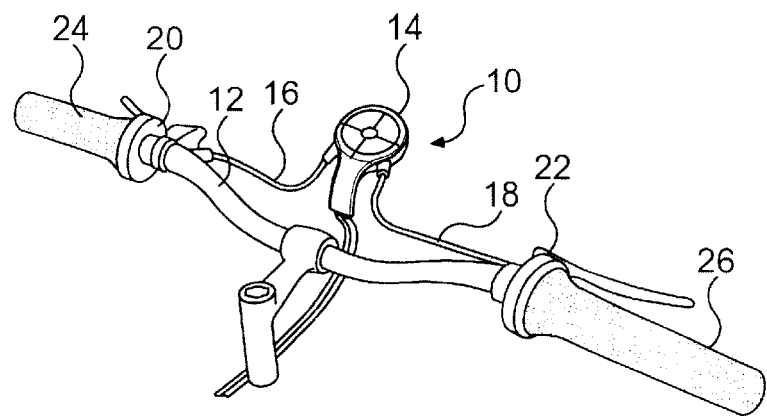
FIG. 1 is a perspective view of a gear indicator in relation to the handlebars of a multiple gear bicycle in accordance with the present invention.

Referring to FIG. 1 of the drawings in detail, numeral 10 generally indicates a gear indicator for a bicycle located near the center of handlebars 12. The gear indicator generally includes a housing 14 mounted onto control cables 16,18. One end of the control cable 16 is connected a front derailleur (not shown) and the other end is connected to a front shift actuator 20 for controlling the front transmission such as a derailleur or internal gear hub system. One end of the control cable 18 is connected to a rear transmission such as a derailleur or internal gear hub system and the other end is connected to a rear shift actuator 22 for controlling the rear transmission. The shift actuators 20,22 are handrotatable shifters mounted on the ends of the handlebars 12 inboard of stationary grips 24,26. While a representative shift actuator has been shown, the shift actuator can be any of various conventional types known to one skilled in the art that actuates a control cable to change gears of a bicycle transmission.

Figure 2:
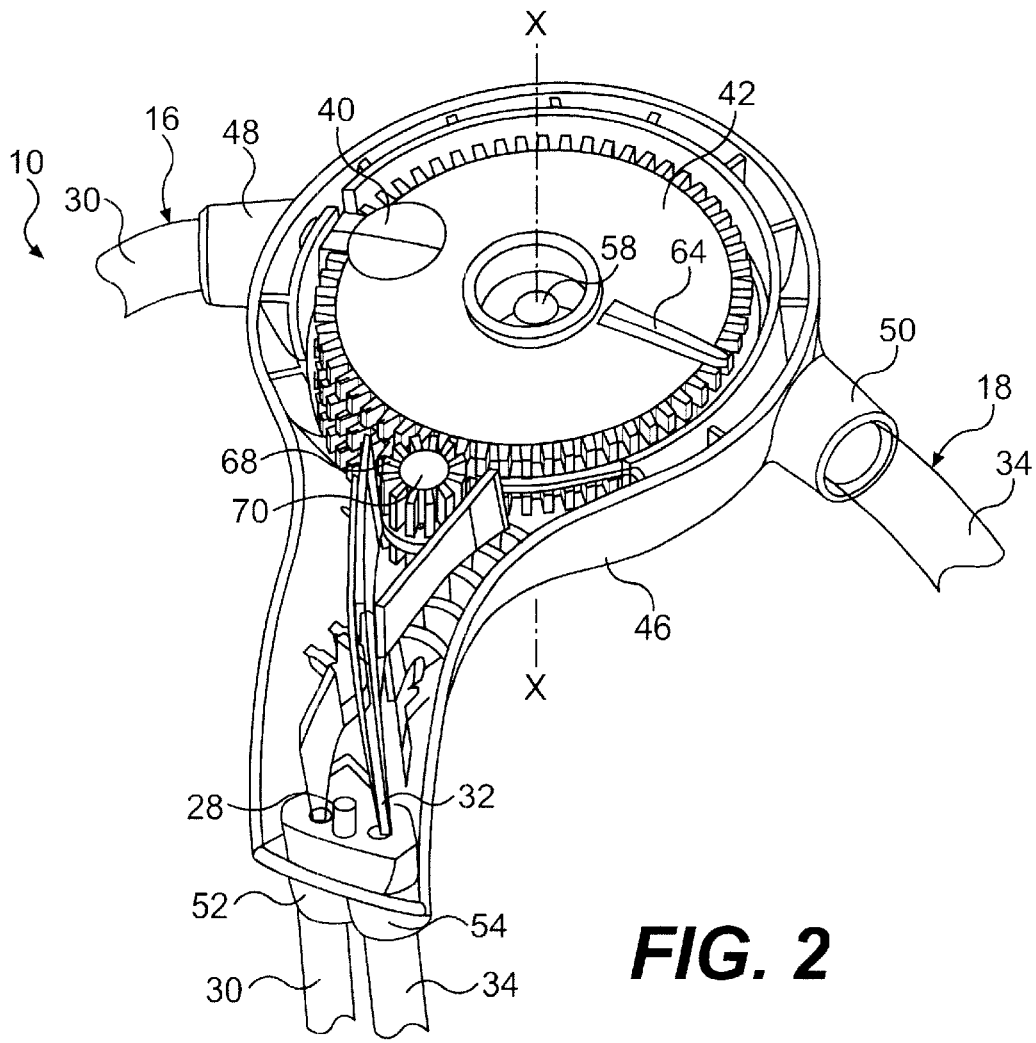
FIG. 2 is a perspective view of the gear indicator with an upper portion of the indicator removed.

Referring to FIG. 2, the control cable 16 includes an inner wire 28 that slides within a tubular housing or casing 30 such that rotation of the shift actuator 20 selectively pulls and releases inner wire 28 to shift gears in the front bicycle transmission. Similarly, the control cable 18 includes an inner wire 32 that slides within a tubular casing 34 such that rotation of shift actuator 22 selectively pulls and releases inner wire 32 to shift gears in the rear bicycle transmission. Referring to FIG. 1, the control cables 16,18, respectively, extend parallel to the handlebars 12 from the shift actuators 20,22 to a point near the center of the handlebars 12 where the control cables 16,18 are bent toward and extend into the gear indicator 10 located proximity near the center of the handlebars 12. The routing of the control cables 16,18 and the stiffness of the cable housing material support the gear indicator 10 and provide stability to the. indicator 10. While the gear indicator 10 is mounted onto the cables 16,18 near the center of the handlebars, the gear indicator 10 could be mounted anywhere on the cables 16,18 as long as it is spaced apart from the shift actuators 20,22.

Figure 3:
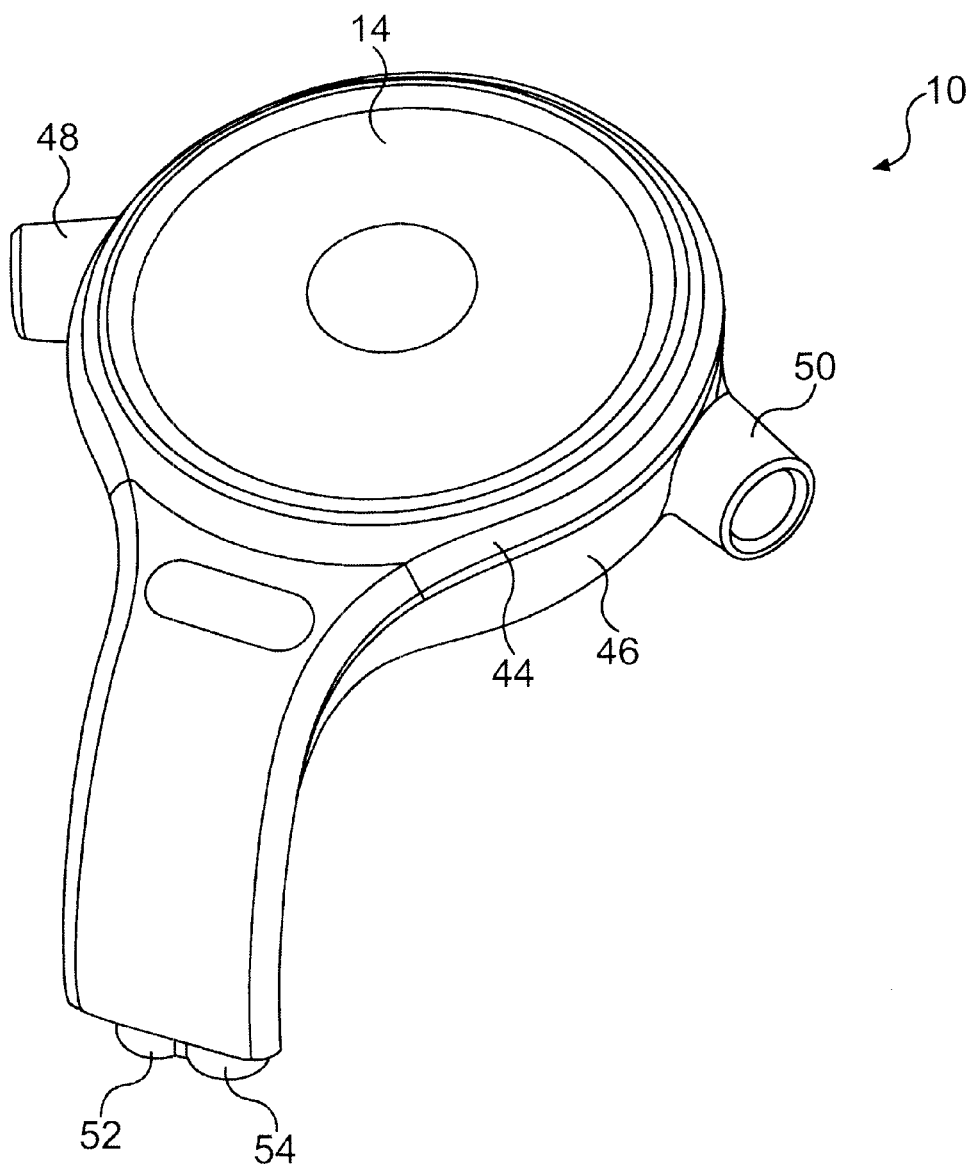
FIG. 3 is a perspective view of the gear indicator.
Figure 4:
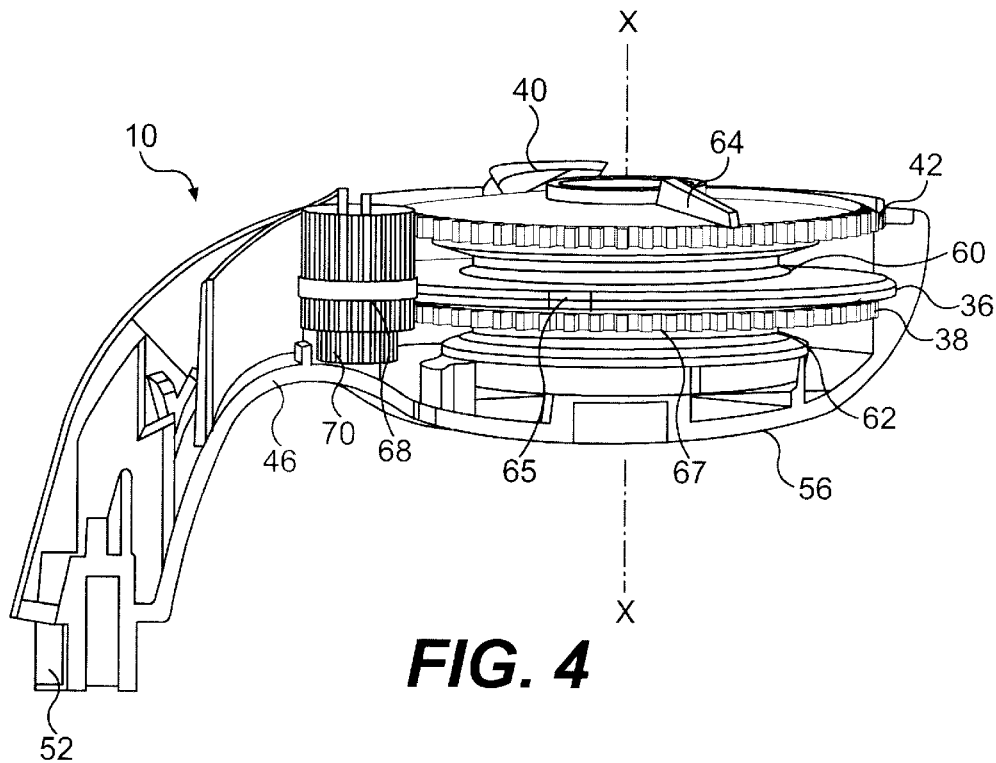
FIG. 4 is a perspective view of the gear indicator with an upper portion and a side portion of the housing removed in accordance with one embodiment of the present invention.

Referring to FIGS. 2–4, the gear indicator 10 includes the housing 14, first and second pulleys 36,38 and first and second gear display elements 40,42. The housing 14 includes an upper portion 44 and a lower portion 46, as shown in FIG. 3. The housing 14 is made from a lightweight plastic such as a polycarbonate material to allow it to be supported by the control cables 16,18. To provide stability for the gear indicator 10, the control cables 16,18 contact the housing at four points. The control cables 16,18 enter the housing 14 at cable inlets 48,50 and exit the housing 14 at cable outlets 52,54. To provide a good viewing angle for the rider, the housing 14 is shaped such that the display elements 40,42 are located in the same plane as the plane the control cables 16,18 enter the housing 14 in and the control cables 16,18 exit the housing 14 in another plane. Preferably, the planes are substantially orthogonal to each other and the viewing angle is 45 degrees from horizontal. The cable casings 30,34 terminate in the cable inlets 40,42 and the inner wires 28,32 extend through the housing 14 as shown in FIG. 2. The shape of the housing 14 also allows the inner wires 28,32 to be self-fed through the housing 14.

The pulleys 36,38 may be coupled to a rear wall 56 of the housing lower portion 46. This is accomplished by stacking the pulleys 36,38 on a shaft 58 (see FIG. 3) having an axis X extending from approximately the center of the rear wall 56. The pulleys 36,38 include cable-winding grooves 60,62 for winding the inner wires 28,32 of the control cables. The displacement of the inner wires 28,32 rotates the pulleys 36,38 about the axis X. Alternatively, the pulleys 36,38 may be coupled to the rear wall 56 separately, each rotating about its own axis, parallel to each other.

Referring to FIG. 4, the display elements 40,42 rotate in response to the rotation of the pulleys 36,38, respectively. Pulley 38 is stacked first on the shaft 58 then the pulley 36 and lastly the display element 42 in the form of a display wheel having a needle indicator 64. The display element 40 for the front transmission may be a paddle extending from the pulley 36 such that the display wheel 42 fits under the paddle when stacked on the shaft 58. This configuration allows the display elements 40,42 and the pulleys 36,38 to rotate about the same axis X, resulting in a compact construction. Stops or indents 65 may be provided on the pulleys to adjust or calibrate the gear indicator 10.

Figure 5:
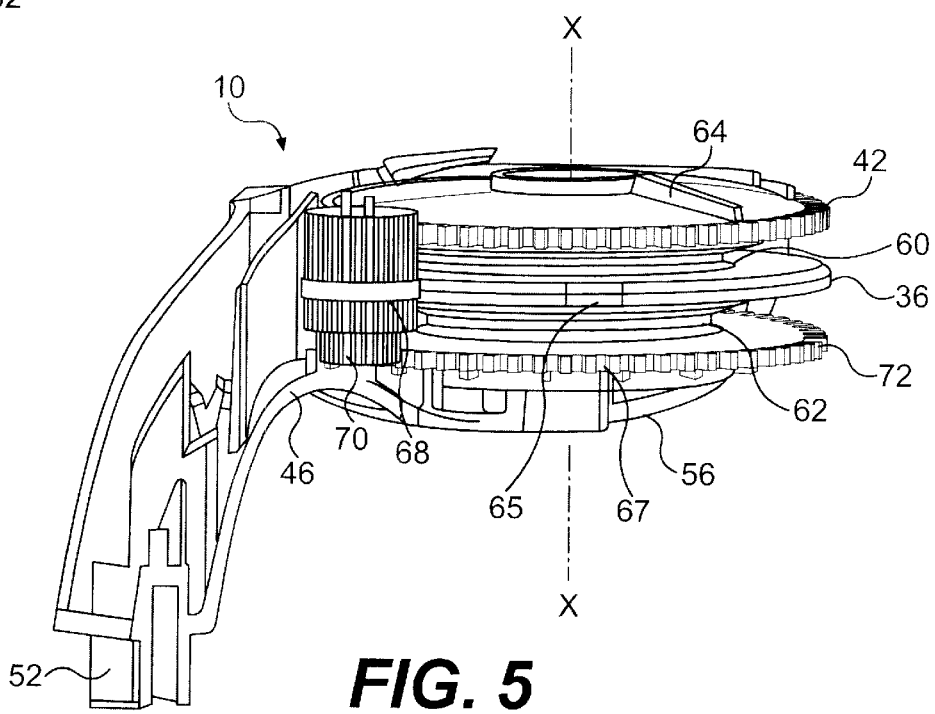
FIG. 5 is a perspective view of the gear indicator with an upper portion and a side portion of the housing removed in accordance with another embodiment of the present invention.

The pulley 38 has a bevel-toothed edge 67 for meshing with a pinion 68 disposed on a shaft 70 extending from the rear wall 56. The pinion 68 operatively connects the pulley 38 to the display wheel 42 such that rotation of the pulley 38 rotates the pinion 68 which in turn rotates the display wheel 42. To accommodate different shift actuators, the pinion 68 may be provided with different radii such that the pulley 38 may be replaced with another pulley 72 that engages a different portion of the pinion 68 to provide a different actuation ratio for the rear derailleur as shown in FIG. 5.

Figure 6:
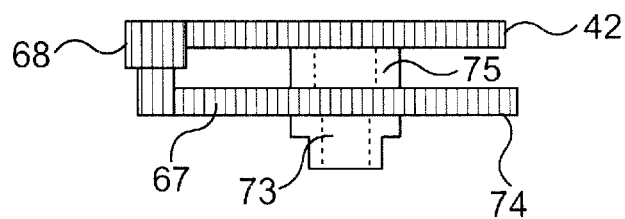
FIG. 6 is a side view of a gear display element operatively connected to a pulley in accordance with another embodiment of the present invention.
Figure 7:
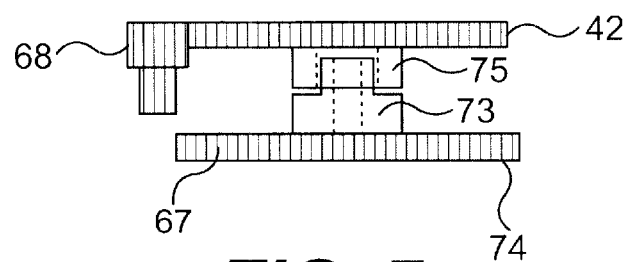
FIG. 7 is a side view of a gear display element operatively connected to a pulley in accordance with another embodiment of the present invention.

Referring to FIGS. 6 and 7, different shifting characteristics of shift actuators may also be accommodated by providing a pulley 74 having a bearing 73 extending from a center of the pulley 74 that may be placed on the shaft 58 of the housing 14 or may be inserted into a sleeve 75 protruding from a center of the display wheel 42. When the bearing 73 is placed on the shaft 58 of the housing 14 the bevel-toothed edge 67 meshes with the pinion 68 to rotate the display wheel 42 as shown in FIG. 6. When the bearing 73 engages the sleeve 75 of the display wheel 42, the bevel-toothed edge 67 does not mesh with the pinion 68 and the display wheel 42 is rotated by the bearing 73 of the pulley 72 as shown in FIG. 7.

Figure 8:
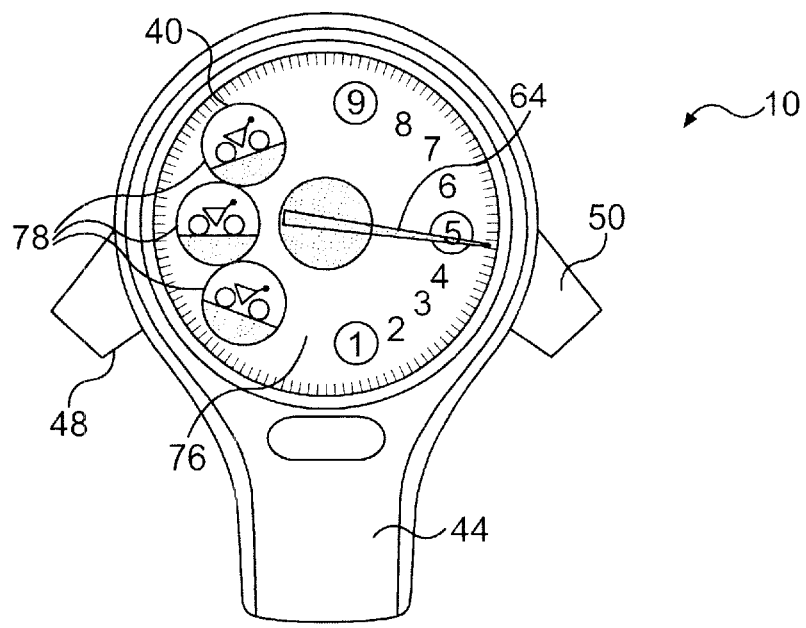
FIG. 8 is a front view of the gear indicator illustrating gear the display elements.

Referring to FIG. 8, the upper portion 44 of the housing may include a display window 76 for viewing the display elements 40,42. The paddle formed on the pulley 36 cooperates with gear indicia formed or printed on the display window 76 to indicate the currently selected gear of the front transmission. For example, bicycle icons 78 may be used to indicate the three gears of a typically front transmission and the paddle may be made of a different color to highlight the bicycle icon representing the currently selected gear. The current gear of the rear transmission is indicated by the needle indicator 64 formed on the display wheel 42 which cooperates with gear indicia formed or printed on the display window 76. The needle indicator 64 may be made of a different color for easy viewing. The large display and the location of the gear indicator near the center of the handlebars also provide easy viewing of the indicator by the rider.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A gear indicator for a bicycle having first and second control cables connected to first and second shift actuators, respectively, the gear indicator comprising:
   a housing mounted onto the first and second control cables, the housing spaced apart from the first and second shift actuators and not attached to handlebars or to a frame of the bicycle;
   a first pulley disposed in the housing and rotatable by a displacement of the first control cable;
   a second pulley disposed in the housing and rotatable by a displacement of the second control cable;
   a first gear display element movable in response to the rotation of the first pulley; and
   a second gear display element movable in response to the rotation of the second pulley.

2. A gear indicator as in claim 1 wherein the housing is supported by the first and second control cables extending through two different planes.

3. A gear indicator as in claim 1 wherein the housing lies in two different planes.

4. A gear indicator as in claim 1 wherein the housing includes at least one cable inlet lying in one plane and at least one cable outlet lying in another plane.

5. A gear indicator as in claim 4 wherein the housing includes a display window for viewing the first and second gear display elements, the display window lying in the same plane as the cable inlet.

6. A gear indicator as in claim 1 wherein the first and second pulleys are substantially coaxial.

7. A gear indicator as in claim 1 wherein the first and second gear displays elements and the first and second pulleys are substantially coaxial.

8. A gear indicator as in claim 1 wherein the housing is mounted onto the control cables in close proximity to a center of the handlebars.

9. A gear indicator as in claim 1 wherein the control cables extend continuously through the housing, each control cable entering the housing in one plane and exiting the housing in another plane.

10. A gear indicator as in claim 1 further comprising a pinion operatively connecting the first pulley to the first gear display element.

11. A gear indication system for a bicycle comprising:
a plurality of control cables connected to a plurality of shift actuators, respectively;
a housing spaced apart from the plurality of shift actuators and. not attached to the handlebars or to a frame of the bicycle;
the control cables extending continuously through the housing, wherein the control cables lie in two different planes;
a plurality of pulleys disposed in the housing and each pulley rotatable by a displacement of a respective control cable; and
a plurality of gear display elements movable in response to the rotation of one respective said pulley.

12. A gear indication system as in claim 11 wherein the housing lies in two different planes.

13. A gear indication system as in claim 11 wherein the housing includes at least one cable inlet lying in one plane and at least one cable outlet lying in another plane.

14. A gear indication system as in claim 13 wherein the housing includes a display window for viewing the plurality of gear display elements, the display window lying in the same plane as the cable inlet.

15. A gear indication system as in claim 11 wherein the two different planes are substantially orthogonal to each other.

16. A gear indication system as in claim 11 wherein the plurality of pulleys are substantially coaxial.

17. A gear indication system as in claim 11 wherein the plurality of gear display elements and the plurality of pulleys are substantially coaxial.

18. A gear indication system as in claim 11 wherein the housing is mounted onto the control cables in close proximity to a center of the handlebars.

19. A gear indication system as in claim 11 wherein the control cables enter the housing in one plane and exit the housing in another plane.

20. A gear indication system as in claim 11 further comprising a pinion operatively connecting at least one of said pulleys to at least one of said gear display elements.

21. A gear indicator for a bicycle having a plurality of control cables connected to a plurality of shift actuators, respectively, the gear indicator comprising:
a housing mounted onto the plurality of control cables and spaced apart from the shift actuators, the housing lying in two different planes and the housing not attached to handlebars or to a frame of the bicycle;
a plurality of pulleys disposed in the housing, each pulley rotatable by a displacement of a respective control cable; and
a plurality of gear display elements movable in response to the rotation of a respective pulley.

22. A gear indicator as in claim 21 wherein the housing is supported by the plurality of control cables extending through two different planes.

23. A gear indicator as in claim 21 wherein the housing includes at least one cable inlet lying in one plane and at least one cable outlet lying in another plane.

24. A gear indicator as in claim 23 wherein the housing includes a display window for viewing the plurality of gear display elements, the display window lying in the same plane as the cable inlet.

25. A gear indicator as in claim 21 wherein the two different planes are substantially orthogonal to each other.

26. A gear indicator as in claim 21 wherein the plurality of pulleys are substantially coaxial.

27. A gear indicator as in claim 21 wherein the plurality of gear display elements and the plurality of pulleys are substantially coaxial.

28. A gear indicator as in claim 21 wherein the housing is mounted onto the control cables in close proximity to a center of the handlebars.

29. A gear indicator as in claim 21 wherein the control cables extend continuously through the housing, each control cable entering the housing in one plane and exiting the housing in another plane.

30. A gear indicator as in claim 21 further comprising a pinion operatively connecting at least one of said pulleys to at least one of said gear display elements.

* * * * *